(12) United States Patent
Kennair, III

(10) Patent No.: US 6,696,115 B1
(45) Date of Patent: Feb. 24, 2004

(54) METHODS OF MAKING REALISTIC ARTIFICIAL OYSTERS ON THE HALF-SHELL

(76) Inventor: Patrick J. Kennair, III, 90 Willow Dr., Gretna, LA (US) 70053

( * ) Notice: Subject to any disclaimer, the term of this patent is extended or adjusted under 35 U.S.C. 154(b) by 0 days.

(21) Appl. No.: 10/225,744

(22) Filed: Aug. 22, 2002

(51) Int. Cl.[7] ................................................ A01N 1/00
(52) U.S. Cl. ......................................................... 428/16
(58) Field of Search ..................... 428/13, 16; 446/153; 63/33, 36; 434/295

(56) References Cited

U.S. PATENT DOCUMENTS 3,556,056 A * 1/1971 Baker ....................... 119/51.04
5,589,528 A * 12/1996 Bogardy ....................... 524/17

OTHER PUBLICATIONS www.trengovestudios.com.*

* cited by examiner

Primary Examiner—Deborah Jones
Assistant Examiner—Arden Sperty
(74) Attorney, Agent, or Firm—Wyatt, Tarrant & Combs, LLP

(57) ABSTRACT

A manufacture resembling a natural oyster on the half-shell comprising an oyster half-shell having a painted artificial oyster fixed therein. The oyster is painted with a certain set of colors in a particular order to thereby create the coloring and appearance of a natural oyster. The shell is preferably a natural oyster shell having an oyster cavity on an interior surface thereof. The artificial is preferably formed from hot glue. A coating of cream, tan, dark brown, and metallic bronze colored paints cover an outer surface of the artificial oyster, such that portions of the various paints are exposed. Splotches of white and black paint are preferably applied in order to mimic the eye region of a natural oyster. A coating of clear coat covers the painted artificial oyster to thereby give the artificial oyster a wet, translucent appearance.

15 Claims, 3 Drawing Sheets

METHODS OF MAKING REALISTIC ARTIFICIAL OYSTERS ON THE HALF-SHELL

CROSS REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention generally relates to taxidermy and nature sculpture, and more particularly to methods for producing realistic looking oysters in oyster shells.

BACKGROUND OF THE INVENTION

Fresh raw oysters are considered a delicacy in the Gulf Coast region of the United States. In Louisiana, the consumption of raw oysters is part of the state's culinary culture and tradition.

Natural oysters are protected by a two piece shell, which encloses the oyster. Oysters are prepared for human consumption by prying open the oyster shell, removing the top shell, and leaving the oyster in the lower shell, or "half-shell." Raw oysters are stored on ice in the shell, and are not opened until immediately before they are to be consumed. In a restaurant or bar, the raw oysters on the half-shell are typically, presented to the diner in the form of a half-dozen or a dozen oysters arranged on a large platter. When the diner is ready to eat an oyster, he or she removes the oyster from its half-shell.

There is a large market for handcrafted sculptures that replicate items of nature. As far as the inventor, who is a taxidermist and artist by trade, is aware, there are no methods for reproducing the appearance of a natural oyster on the half-shell. There is thus a need for the methods and manufactures described below.

BRIEF SUMMARY

Accordingly, a manufacture that resembles a natural oyster on the half-shell is provided comprising, generally, an oyster half-shell having a painted artificial oyster fixed therein. The oyster is painted with a certain set of colors in a particular order to thereby create the coloring and appearance of a natural oyster. The shell is preferably a natural oyster shell having an oyster cavity on an interior surface thereof. The artificial oyster is preferably formed from hot glue. A coating of cream colored paint covers an outer surface of the artificial oyster. A coating of tan colored paint intermittently covers the cream colored paint, leaving portions of the cream colored paint exposed on the outer surface. A coating of dark brown colored paint intermittently covers the cream and tan colored paints, leaving portions of the cream and tan colored paints exposed. A coating of metallic bronze colored paint intermittently covers the cream, tan, and dark brown colored paints, leaving portions of the cream, tan, and dark brown colored paints exposed. To further enhance the appearance of natural oyster, a splotch of white colored paint is preferably placed over an eye region of the artificial oyster, a splotch of black or black-gray colored paint is preferably placed immediately adjacent the eye region of the artificial oyster. Each color of paint is preferably applied before the preceding colors of paint dries, to thereby mute each of the colors. A coating of clear coat covers the painted artificial oyster to thereby give the artificial oyster a wet, translucent appearance.

Methods of forming the artificial oyster from hot glue and of applying the layers of paint are provided. The artificial oysters can be used for various purposes, including taxonomic displays, decorative displays, as components of necklaces, and as various items of a decorative or trinket nature. The methods of the invention also provide a means of using waste oyster shells.

PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
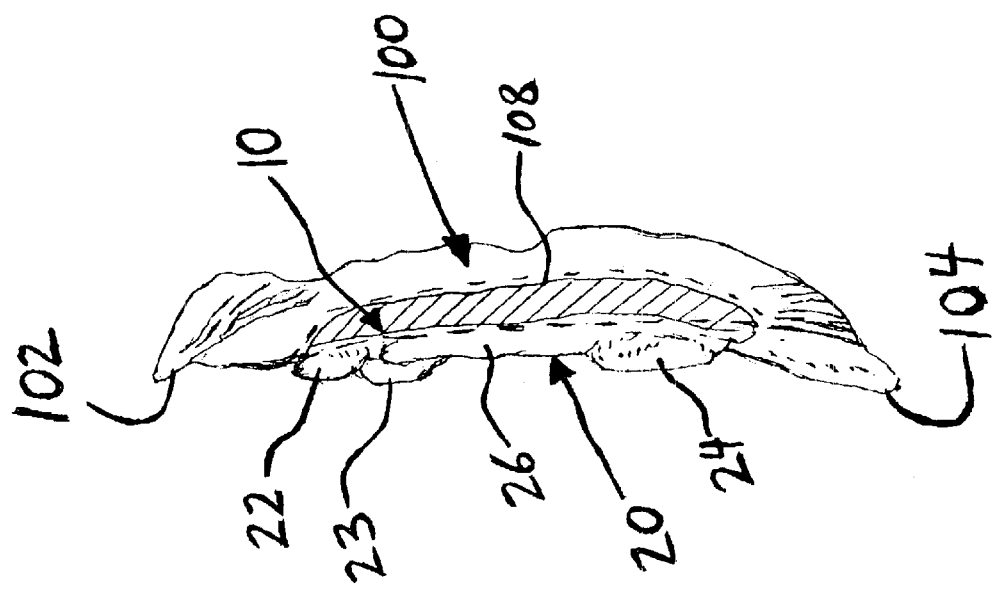
FIG. 1 is a horizontal perspective view of one preferred embodiment of an artificial oyster on the half-shell.
Figure 2:
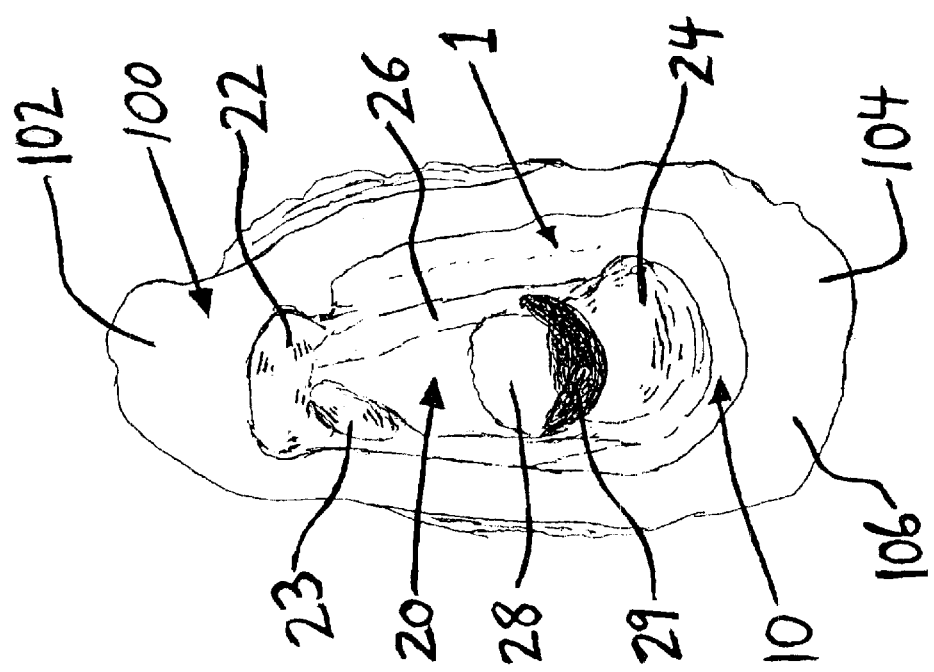
FIG. 2 is a partial cross-section side view of the artificial oyster on the half-shell of FIG. 1.

FIG. 1 shows a preferred embodiment of an artificial oyster 1 that has been configured to look like a natural oyster on the half-shell. In a preferred embodiment shown in FIG. 2 and described in further detail below, the artificial oyster 1 is formed by filling the interior side or oyster cavity 108 of a natural oyster shell 100 with a first layer of hot glue 10, imitating the appearance of the "body" of the oyster. A second layer of hot glue 20 is poured or formed over the first layer 10 in three main areas of the interior of the shell: the top 22, the bottom 24, and somewhere between the top and bottom 23.

A key feature of the invention is the use of a particular combination of paints and coatings that are applied at particular locations and in a particular order to create a wet, iridescent, and translucent effect that closely resembles the appearance of a natural oyster. The translucent effect is particularly effective because it gives the impression that internal organs are vaguely visible through the surface of the oyster, an effect that closely mimics the appearance of a fresh raw oyster on the half-shell.

Figure 3:
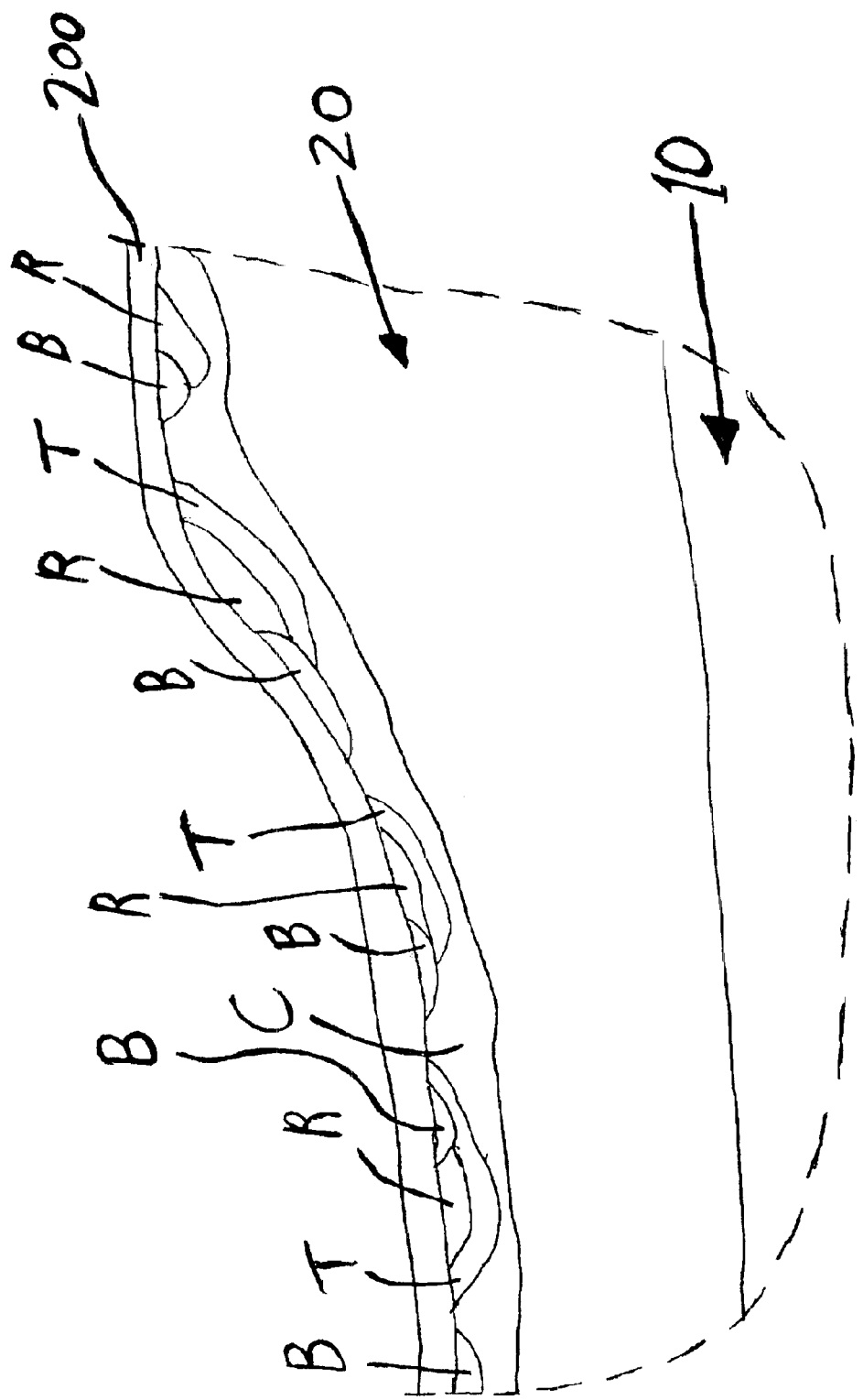
FIG. 3 is a close up view of FIG. 2, showing details of overlap of the coats of paint used to create the appearance of a natural oyster on the half-shell.

FIG. 3 describes how the various colors of paint are added to the hot glued area of the interior of the natural oyster shell to create the appearance of a natural oyster inside the shell. As shown in FIG. 3, a cream-colored paint C is painted over the entire hot glued area of the oyster. An acceptable cream colored paint C is typically sold as the color "linen." A tan-colored acrylic paint T is painted over the cream-colored paint C in a hit-and-miss fashion, creating an intermittent coat that leaves the cream colored paint C exposed. An acceptable tan colored paint is typically sold as the color "camel." A dark brown colored paint R is painted over the cream C and tan T paints in a hit-and-miss fashion to create an intermittent coat. The dark brown shade R is preferably raw umber or burnt umber. The dark brown shade functions somewhat like a shadow, giving the illusion of thickness to the oyster. Metallic bronze-colored acrylic paint B is painted over the cream C, tan T, and dark brown R colored paints in a hit-and-miss fashion to create an intermittent coat. The bronze paint adds a metallic effect. Acceptable metallic bronzes are sometimes sold as the color "iridescent bronze." Other colors and color combinations could be used, but it is believed that the foregoing colors, applied in the foregoing sequence, provide a particularly natural looking artificial oyster on the half-shell.

The foregoing colors in themselves will create the appearance of a natural raw oyster. However, in order to further enhance the natural appearance a splotch of black or black-gray paint 29 and a splotch of white 28 paint are preferably added to mimic the eye region 28 found on natural raw oysters. As shown in FIG. 1, the black or black-gray colored splotch of paint 29 is painted over the top edge of the bottom projection 24. The white colored splotch of paint 28 is painted in a small area above the top edge of the bottom projection 24, adjacent the black-colored painted area 29.

The colors are preferably applied using a conventional "wet-on-wet" technique in which each color is applied before the previous colors dry. The wet-on-wet technique allows the colors to mute one another, which enhances the realistic appearance of the artificial oyster. Only very small amounts of the overlay colors are used. Metallic bronze is a particularly powerful color, and should be used in very small amounts, such as a few small strips of paint.

The painting methods of the invention are preferably done with conventional acrylic paints. Non-acrylic paints can be used to create the wet and translucent appearance of a natural oyster, but acrylics provide an optimal combination of appearance, economy, and practicality. For example, oil paints produce a natural looking oyster, but they take a long time to dry, and thus may be impractical for many applications of the invention. Heat can be used to speed up the drying time of the paint.

As far as the inventor is aware, any conventional brand of acrylic paint can be used to carry out the painting technique of the invention. The inventor prefers the brands Crafters Edition and Daler-Rowney. Other acceptable acrylics include, but are not limited to, Liquitex, Golden, Accent, and Delta. All of these brands differ slightly from one another. For example the linen color of one brand may be off white, while the linen of another brand may be almost a cream color. Because natural oysters have slightly different colors and shades, the use of acrylic brands having slightly different shades of color from the preferred brands will not diminish the quality of the artificial oyster, since the added variation will approximate the variation found in nature.

After the layers of paint have been applied, the oyster will appear somewhat drab. As shown in FIG. 3, in order to bring out the colors and create a wet, translucent effect, the painted oyster is preferably coated with a clear coat finish 200, such as epoxy resin, scenery resin, liquid plastic, polyurethane resin, or urethane coating resin. The clear coat preferably covers both the oyster and the exposed rim 106 of the half-shell. Prior to applying the clear coat 200, words or other decorative markings can be applied to the exposed rim 106 of the half-shell. A bead can also be placed on the oyster 1 prior to adding the clear coat, to mimic the appearance of an oyster containing a pearl. Most clear coats require about 24 hours to dry. A heat gun can be used to decrease drying time.

A preferred brand of clear coat 200 is sold under the trademark Klear-Kotes®. Klear-Kote® is an epoxy resin that provides a thick coating that enhances the realistic appearance of the artificial oyster. Klear-Kote®, which is conventionally used in wood working to provide a high-gloss finish, is inexpensive and can be obtained in large quantities. Klear-Kote® can be obtained from Southern Time Corp., 1–4 Industrial Park, Sanford, Fla. 32771 (407-321-4277). Other acceptable clear coats include: Enviro Tex, an epoxy resin that can be found at K-Mart, Wal-Mart, and most arts and crafts stores; Casting Craft Clear, a liquid plastic casting resin that is distributed by ETI Corp., Fields Landing, Calif. 95537 (707-443-9323); Por-A-Kast, a polyurethane resin distributed by Synair Corp., 2003 Amnicola Highway, Chattanooga, Tenn. 37406 (800-251-7142); and Crystal Clear 202 or Crystal Clear 30, a urethane casting resin distributed by Smooth On Corp, 2000 St. John Street, Easton, Pa. 18042 (610-252-5800).

The invention preferably uses a natural oyster shell 100 in which the natural oyster has been replaced by an artificial oyster 1. The above described painting technique can also be applied to a completely artificial pre-formed oyster 1 on the half-shell, which can be molded from plastic, metal, ceramics, or other suitable materials. One advantage of pre-formed oysters on the half-shell is that they can be made in a uniform size. Uniformly sized oysters can be painted using automated painting processes. Uniformly sized oysters are also easier to use in subsequent manufacturing operations, such as in creating necklaces. Despite these advantages of using a pre-formed oyster on the half-shell, the use of an artificial oyster shell is likely to result in a less realistic looking artificial oyster.

In addition to the unique painting technique described above, the present invention also includes a novel method of using hot glue to form the artificial oyster 1 component of the oyster on the half-shell. Hot glue extruded from a conventional hot glue gun, such as the type commonly available in hobby stores, provides an optimal material and technique for forming the artificial oyster 1, particularly when using a natural half-shell 100. The use of hot glue overcomes a number of problems associated with the use of natural oyster shells: (1) in order to accommodate the wide array of sizes and shapes of natural oyster shells, the size of the artificial oyster must be selected for each particular shell; (2) in order to form the surface bumps of the oyster, the oyster must be made of a material that initially flows into position and then rapidly assumes a final shape; (3) the artificial oyster 1 must stick firmly to the oyster shell 100; (4) the artificial oyster 1 preferably hardens within a short amount of time so that paint can be applied; and (5) the artificial oyster 1 must be made of a material that can be painted. Hot glue guns are widely used on arts and crafts projects to fasten components together. However, as far as the inventor is aware, hot glue has not been used as a material for forming objects, such as sculptural items. Likewise, the inventor is unaware of attempts to paint hot glue.

The hot glue is preferably applied in a two part process. The shell is laid on a flat surface with the oyster cavity 108 facing up. As shown most clearly in FIG. 2, an initial layer of hot glue is extruded into the oyster cavity 108 to form a first layer 10. The first layer 10 preferably substantially fills the oyster cavity 108. The hot glue conforms naturally to the contour of the oyster cavity 108 and sticks tightly to the surface of the cavity 108. As shown in FIG. 1, a rim 106 of the oyster shell 100 remains visible around the periphery of the first layer 10 of the oyster 1, thereby mimicking the appearance of a natural oyster on the half-shell. The first layer 10 of hot glue is allowed to harden for a couple of minutes.

Once the first layer 10 of hot glue has hardened sufficiently, a plurality of projections 22, 23, and 24 are formed from a second application of hot glue, in order to mimic the surface projections of a natural oyster. The projections 22, 23, 24 generally take the form of ridges or bumps, but the size and shape of the ridges is not critical because natural oysters come in a wide array of configurations. A top projection 22 is formed along or adjacent the top end of the oyster 1. A bottom projection 24 is formed along or adjacent the bottom end of the oysters 1. A middle projection 23 is formed between the top 22 and bottom 24 ridges, preferably closer to or adjacent to the top projection 22. An open area, consisting of the first layer 10 of hot glue, is left adjacent to the bottom projection 24 to form the eye region 28 of the artificial oyster 1 (the "eye" is a whitish area that is found in natural oysters). Additional projections, such as a side projection 26, can be added if desired. Once the projections 22, 23, and 24 have been formed, the hot glue will flow naturally into position prior to drying, creating the smooth, rounded surface projections found on natural oysters.

A preferred brand of hot glue is Crafty Multi-Temp, which is distributed by Adhesive Technologies, Inc., Hampton, N.H. 03842. This particular brand of hot glue is somewhat cloudy, and when painted it makes a more natural looking oyster. Crafty Multi-Temp comes in a two-temperature glue stick that can be used with high or low temperature glue guns. Crafty Multi-Temp is available at Wal-Mart and most arts and crafts stores.

The oyster can be formed from other materials, such as epoxy. However, hot glue has several advantages over epoxy. Because epoxy is formed from a separate base and a hardener, it can be difficult to mix epoxy in the correct proportions. If too much hardener is used, the epoxy will harden before the projections can be formed. If too little hardener is used, the epoxy will take too long to harden. Additionally, it is more difficult and time consuming to form projections from epoxy, because they must be formed by hand rather than being extruded from a hot glue gun.

The methods of the invention also provide an efficient way of using waste oyster shells. Oyster half-shells can be readily obtained from seafood markets, where they pile up in large quantities and must be discarded as waste. The waste half-shells can be readily cleaned by washing them with soap and water and then disinfected by washing them with a disinfectant, such as borax and water.

The artificial oysters on the half shell created by the foregoing techniques can be used for various purposes. They can be sold or displayed individually, or used in decorative arrangements, such as a tray of oysters on the half-shell. They can also be incorporated into necklaces, such as the type conventionally worn during Mardi Gras celebrations.

Figure 4:
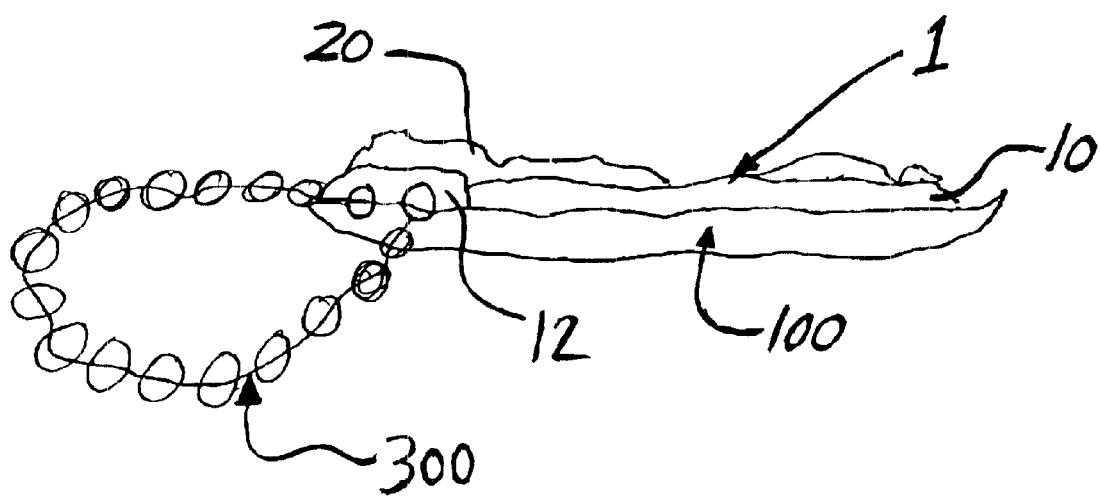
FIG. 4 is a horizontal view of the hand-sculpted oyster in a natural oyster shell with a beaded string.

FIG. 4 shows one preferred embodiment of a method of attaching a string of beads 300 to an artificial oyster on the half-shell. The beads are preferably plastic, such as the type conventionally used as Mardi Gras beads. As shown in FIG. 4, a small amount 12 of hot glue 10 is used to attach the beaded string 300 to the interior side of the natural oyster shell. The strand of beads is preferably cut in half, and each of the cut ends is then embedded in the dab 12 of hot glue 10. The first layer of hot glue 10 is then added to the interior side of said shell. The second layer of hot glue 20 is then poured over the first layer 10 in three main areas of the interior of the shell. The hot glued area is then painted using the technique described above. Alternatively, for mass production of Mardi Gras beads, the entire oyster and half-shell can be molded from plastic using conventional plastic molding or bead manufacturing technologies, and then painted in the manner described above.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A manufacture that resembles a natural oyster on the half-shell comprising:

an oyster half-shell, said shell having an oyster cavity on an interior surface thereof, an artificial oyster fixed in said oyster cavity, said oyster consisting of hot glue, a coating of cream colored paint covering an outer surface of said artificial oyster, a coating of tan colored paint intermittently covering said cream colored paint to thereby leave portions of said cream colored paint exposed on said outer surface, a coating of dark brown colored paint intermittently covering said cream and tan colored paints to thereby leave portions of said cream and tan colored paints exposed, a coating of metallic bronze colored paint intermittently covering said cream, tan, and dark brown colored paints to thereby leave portions of said cream, tan, and dark brown colored paints exposed, and a coating of clear coat covering said painted artificial oyster to thereby give said artificial oyster a wet, translucent appearance.

2. The manufacture of claim 1, wherein said hot glue artificial oyster comprises:

a first layer of hot glue, and at least a top and a bottom projection extending from said first layer of hot glue, said top and bottom projections formed from hot glue, said top and bottom projections configured to mimic the appearance of projections on a natural raw oyster.

3. The manufacture of claim 1, further comprising:

a splotch of white colored paint over an eye region of said artificial oyster, and a splotch of black or black-gray colored paint immediately adjacent said eye region of said artificial oyster, said splotches interposed between said clear coat and said coatings of cream, tan, dark brown, and bronze colored paints.

4. The manufacture of claim 1, further comprising a string of beads extending from said artificial oyster to thereby form an oyster necklace.

5. The manufacture of claim 1, wherein said oyster half-shell is a natural oyster shell.

6. A manufacture that mimics the appearance of a natural oyster on the half-shell comprising:

a half-oyster shell, said shell having an interior surface;

an artificial oyster formed on said interior surface of said shell; and a coating means on an exposed exterior surface of said oyster for giving said oyster the appearance of a natural raw oyster.

7. The manufacture of claim 6, wherein said artificial oyster consists of hot glue.

8. The manufacture of claim 6, wherein said artificial oyster comprises two layers of glue, said first layer of glue evenly covering said interior surface of said shell and said second layer of glue forming at least two raised ridges over said first layer.

9. A method of making a realistic artificial oyster on the half-shell, comprising:

providing a half oyster shell, said shell having an artificial oyster fixed therein, said artificial oyster having an eye region on an outer surface thereof, applying a cream colored paint over said outer surface of said artificial oyster to thereby substantially cover said outer surface, applying a tan colored paint over said cream colored paint in an intermittent fashion to thereby leave portions of said cream colored paint exposed, applying a dark brown colored paint over said cream and tan colored paint in an intermittent fashion to thereby leave portions of said cream and tan colored paints exposed, applying a metallic bronze colored paint over said cream, tan, and dark brown colored paints in an intermittent fashion to thereby leave portions of said cream, tan, and dark brown colored paints exposed, and applying a clear coat over said entire painted artificial oyster to thereby give said artificial oyster a wet, translucent appearance.

10. The method of claim 9, wherein each said color of paint is applied before said preceding colors of paint dry, to thereby mute each of said colors.

11. The method of claim 9, further comprising, before applying said clear coat, applying a splotch of black or black-gray colored paint immediately adjacent said eye region of said artificial oyster, and applying a splotch of white colored paint over said eye region of said artificial oyster adjacent said black or black-gray colored paint, said splotches being interposed between said clear coat and said coatings of cream, tan, dark brown, and bronze colored paints.

12. The method of claim 9, wherein said artificial oyster is fixed in said shell by the following steps prior to applying said paints:

laying said shell on a flat surface with an oyster cavity of said shell facing up, extruding an initial layer of hot glue into said oyster cavity to thereby form a first layer of hot glue, said first layer substantially filling said oyster cavity while leaving a rim of said oyster shell visible around a periphery of said first layer of said oyster, allowing said first layer of hot glue to harden for at least about two minutes, extruding a second layer of hot glue on said first layer of hot glue in order to mimic the surface projections of a natural oyster, said second layer comprising a top projection formed along or adjacent a top end of said oyster, a bottom projection formed along or adjacent a bottom end of said oyster, and a middle projection formed between said top and said bottom projections and adjacent said top projection, while leaving an open area consisting of the first layer of hot glue adjacent to the bottom projection to thereby form said eye region of said artificial oyster, and allowing said hot glue projections of said second layer to flow naturally into position to thereby create the smooth, rounded surface projections found on natural oysters.

13. The method of claim 12, further comprising inserting a portion of a string of beads in said first layer of hot glue prior to allowing said first layer of hot glue to dry, said string of beads extending from said artificial oyster to thereby form an oyster necklace.

14. The method of claim 11, wherein said artificial oyster is fixed in said shell by the following steps prior to applying said paints:

laying said shell on a flat surface with an oyster cavity of said shell facing up, extruding an initial layer of hot glue into said oyster cavity to thereby form a first layer of hot glue, said first layer substantially filling said oyster cavity while leaving a rim of said oyster shell visible around a periphery of said first layer of said oyster, allowing said first layer of hot glue to harden for at least about two minutes, extruding a second layer of hot glue on said first layer of hot glue in order to mimic the surface projections of a natural oyster, said second layer comprising a top projection formed along or adjacent a top end of said oyster, a bottom projection formed along or adjacent a bottom end of said oyster, and a middle projection formed between said top and said bottom projections and adjacent said top projection, while leaving an open area consisting of the first layer of hot glue adjacent to the bottom projection to thereby form said eye region of said artificial oyster, and allowing said hot glue projections of said second layer to flow naturally into position to thereby create the smooth, rounded surface projections found on natural oysters.

15. The method of claim 14, further comprising inserting a portion of a string of beads in said first layer of hot glue prior to allowing said first layer of hot glue to dry, said string of beads extending from said artificial oyster to thereby form an oyster necklace.

* * * * *